United States Patent [19]

Atsushi

[11] Patent Number: 4,952,463
[45] Date of Patent: Aug. 28, 1990

[54] FERRITE-CERAMIC COMPOSITE POWDER AND METHOD OF MANUFACTURING THE SAME

[75] Inventor: Ogura Atsushi, Kamakura, Japan

[73] Assignee: Okura Techno-Research Kabushiki Kaisha (Okura Techno-Research Company Ltd.), Tokyo, Japan

[21] Appl. No.: 237,646

[22] Filed: Aug. 26, 1988

Related U.S. Application Data

[63] Continuation of Ser. No. 921,679, Oct. 21, 1986, abandoned.

[30] Foreign Application Priority Data

Oct. 29, 1985 [JP] Japan .................................. 60-240389

[51] Int. Cl.$^5$ ............................ B22F 5/00; B05D 5/12
[52] U.S. Cl. .................................... 428/552; 428/900; 427/126.6; 427/128
[58] Field of Search ............... 428/548, 900, 403, 552; 427/126.6, 405, 128

[56] References Cited

U.S. PATENT DOCUMENTS

| | | | |
|---|---|---|---|
| 3,044,867 | 7/1962 | Edstrom | 75/0.5 |
| 3,892,908 | 7/1975 | Lovness | 428/329 |
| 3,996,392 | 12/1976 | Berg et al. | 428/900 X |
| 4,065,519 | 12/1977 | Koch | 428/900 X |
| 4,075,391 | 2/1978 | Berg et al. | 428/900 X |
| 4,160,719 | 7/1979 | Pollock | 75/235 X |
| 4,180,482 | 12/1979 | Nishino et al. | 428/450 X |
| 4,447,501 | 5/1984 | Shigeru et al. | 428/570 |
| 4,587,157 | 5/1986 | Brock et al. | 427/131 X |
| 4,624,798 | 11/1986 | Gindrup et al. | 428/403 X |

Primary Examiner—Peter A. Nelson
Attorney, Agent, or Firm—Darby & Darby

[57] ABSTRACT

Disclosed is a ferrite-ceramic composite powder consisting of fine particles of a ceramic material having a ferrite coating firmly bonded to the surface thereof. The ferrite-ceramic composite powder is manufactured by the steps of immersing pellets of iron in an aqueous solution of ferric chloride in the presence of a magnetic field thereby turning the ferric chloride solution into an aqueous solution of a complex salt, mixing the complex salt solution with an aqueous solution of ferric chloride containing many fine particles of a ceramic material and agitating the mixture to obtain a composite aqueous solution, mixing an aqueous solution of caustic soda with the composite aqueous solution and agitating the mixture to cause deposition of crystals of a ferrite on the surface of the fine ceramic particles, rinsing the particles, and drying the particles.

23 Claims, No Drawings

FERRITE-CERAMIC COMPOSITE POWDER AND METHOD OF MANUFACTURING THE SAME

This is a continuation of application Ser. No. 921,679, filed Oct. 21, 1986, and now abandoned.

BACKGROUND OF THE INVENTION

1. Field of the Invention

This invention relates to a ferrite-ceramic composite powder and a method of manufacturing the same.

2. Description of the Prior Art

Ceramics have a melting point higher than that of metals, and sintering or melting a powdery ceramic material to manufacture a ceramic product requires heating at high temperatures. In an effort to solve such a problem, researches and studies have been made to manufacture a ceramic product by sintering super-fine ceramic particles having a grain size in the order of the angstrom unit. However, a satisfactory method of manufacturing such a ceramic product has not been developed yet. Further, in order to manufacture a multicomponent composite product having a sufficiently homogeneous microstructure consisting of a plurality of kinds of components, it is necessary to sufficiently homogeneously blend the plural kinds of components. However, homogeneous blending of fine particles of such components has been physically difficult. Accordingly, it has been difficult to obtain a composite product in which the fine particles of the components are sufficiently homogeneously and perfectly blended to satisfy the designed physical properties and functional requirements.

On the other hand, ferrites, which are oxides, have excellent magnetic characteristics and are widely used in various kinds of electromagnetic devices as a magnetic material. However, due to the necessity for thorough blending of impurity-free components at a predetermined composition ratio for the production of a ferrite showing excellent magnetic characteristics, production of the ferrite having a very high purity capable of sufficiently exhibiting the desired magnetic characteristics has been encountered with the problem of the price.

SUMMARY OF THE INVENTION

With a view to solve the prior art problems pointed out above, it is an object of the present invention to provide a ferrite-ceramic composite powder suitable for production of a functional multicomponent composite product having a sufficiently homogeneous microstructure.

Another object of the present invention is to provide a ferrite-ceramic composite powder which can improve the magnetic characteristics of the ferrite.

Another object of the present invention is to provide a method of economically manufacturing the ferrite-ceramic composite powder described above.

The ferrite-ceramic composite powder according to the present invention is provided by firmly bonding crystals of a ferrite to the surface of fine particles of a ceramic material according to a process similar to a plating process, thereby completely coating the surface of the fine particles of the ceramic material with the deposited ferrite. When the ferrite-ceramic composite powder thus obtained is sintered by application of heat, the heat is efficiently transmitted from the ferrite coating toward and into the fine particles of the ceramic material coated with the ferrite, and the ferrite coating remains to coat the ceramic material until the fine particles of the ceramic material are completely molten. As a result, the ferrite component and the ceramic component are blended to form a homogeneous solid solution. Therefore, the ferrite-ceramic composite powder of the present invention can find a variety of industrial applications as a material of industrial products. For example, the composite powder according to the present invention can be used as a material of magnetic memories, electronic parts (insulating elements, semiconductor elements, heat generating elements, thermistors, varistors, dielectric elements, pyroelectric elements, piezoelectric elements, photoelectric elements, photomagnetic elements and the like), electrical parts, paint pigments, corrosion resistive members, mechanical parts and magnetic fluids.

According to the present invention, such ferrite-ceramic composite powder in which a ferrite is firmly bonded to and coats the surface of fine particles of a ceramic material is produced by the steps of bringing an aqueous solution of ferric chloride into contact with many pieces or pellets of iron in the presence of a magnetic field to turn the ferric chloride solution into an aqueous solution of a complex salt, mixing this complex salt solution with an aqueous solution of ferric chloride containing many fine particles of a ceramic material and agitating the mixture to obtain a composite aqueous solution, mixing an aqueous solution of caustic soda with the composite aqueous solution and agitating the mixture to cause deposition of ferrite crystals on the surface of the fine particles of the ceramic material, and rinsing and drying the fine particles of the ceramic material covered with the ferrite. According to the method described above, a ferrite coating having a very high purity can be firmly bonded to the surface of fine particles of a ceramic material in a very simple manner. Therefore, a ferrite-ceramic powder which can be used as a magnetic powder too can be very simply and economically produced.

Fine ceramic particles preferably used in the present invention include those of oxides containing a metallic element or a semimetallic element, such as, zirconia ($ZrO_2$), zircon ($ZrSiO_4$), silicon dioxide ($SiO_2$), alumina ($Al_2O_3$), cobalt oxide, titanium oxide, barium oxide and boron oxide. Also, fine particles and compounds such as nitrides including silicon nitride, those of carbides including silicon carbide and those of various mixtures of the aforementioned materials may be used.

A salt of a metallic element or a semimetallic element, such as, nickelic chloride, cobalt chloride, barium chloride or titanium chloride may be added to the ferric chloride used for the production of the ferrite-ceramic composite powder. When such a chloride is added, a film containing an oxide of the metal or semimetal component such as cobalt, barium or titanium together with iron can be formed on the surface of the fine particles of the ceramic material.

Other objects and features of the present invention will become apparent from the following description.

DESCRIPTION OF THE PREFERRED EMBODIMENT

First, at least one magnet having a strong magnetic force is placed in a vessel containing an aqueous solution of ferric chloride having a concentration of about 5 to 35%, so as to establish a magnetic field. Then, many pieces of iron, for example, many pellets of iron having a grain size of about 0.1 to 4 mm are immersed in the aqueous solution of ferric chloride, and the solution is thoroughly agitated. Then, the solution is filtered to obtain an aqueous solution of a complex salt.

In the above steps, the aqueous solution of ferric chloride is brought into contact with the magnetized iron pellets in the vessel. Therefore, many cathodes and anodes are formed as a result of the electrolytic ion exchange, and hydrogen ions attracted to the cathodes are discharged as hydrogen gas. Thus, the complex salt solution contains stabilized anions and cations.

An aqueous solution of ferric chloride having a concentration of about 5 to 35% and containing fine particles of a ceramic material having a grain size distribution of about $0.05\mu$ to several mm, preferably, 0.05 to $20\mu$, is separately prepared. The complex salt solution is mixed with this ferric chloride solution in a proportion of about 30 to 50% of the total volume. The mixture is thoroughly agitated to provide a composite aqueous solution. This composite aqueous solution is acidic and contains $Cl^-$ ions Then, when an aqueous solution of caustic soda having a concentration of about 30% is mixed with the composite aqueous solution containing the fine ceramic particles, dark brown crystals of a ferrite ($Fe_3O_4$) are substantially uniformly deposited on the surface of the fine ceramic particles. The remainder is dilute salt water.

The ferrite-ceramic composite particles are then allowed to precipitate, and the supernatant portion of the solution is discarded. Alternatively, water is separated from the solution by centrifugal separation to leave the precipitate. Then, water is added to the precipitate to wash away the salt. Thereafter, the water remaining still in the precipitate is separated by evaporation, and the precipitate is dried to provide the ferrite-ceramic composite particles in which the ferrite crystals of high purity are deposited on the surface of the fine ceramic particles.

In the ferrite-ceramic composite particle thus manufactured, the ferrite ($Fe_3O_4$) is substantially uniformly deposited on the surface of each of the ceramic particles. The grain size (distribution) of the composite particles is about 0.1 to $25\mu$ when the original grain size of the fine ceramic particles is about 0.05 to $20\mu$. Also, the ferrite is firmly bonded to the surface of the fine ceramic particles and is not stripped off even by inpartation of mechanical friction or impact. Such a strong bond is attained by plating-like ionic bonding of the ferrite to the surface of the fine ceramic particles.

When the ferrite-ceramic composite particles are sintered together with another metal, the unit particles comprising the integral combination of the ferrite and the fine ceramic particles are dispersed substantially uniformly in the sintered product.

Also, when the ferrite-ceramic composite particles are molton at a high temperature and then cooled to solidify, a solid solution is obtained in which the ferrite component and the ceramic component are homogeneously mixed. This solid solution can be expected to possess excellent characteristics suitable to form various kinds of functional elements such as insulating elements, semiconductor elements, heat generating elements and heat-sensitive elements.

Further, a sintered product of the ferrite-ceramic composite particles can also be utilized as a magnetic material.

It will be understood from the foregoing description that the ferrite-ceramic composite powder according to the present invention can be effectively used as a material for manufacturing a variety of secondary industrial products and can be expected to exhibit excellent characteristics over the prior art especially when used as a material for manufacturing insulating elements, semiconductor elements, etc.

I claim:

1. A ferrite-ceramic composite powder comprising: fine particles of a ceramic material, said fine ceramic particles each having a precipitated ferrite crystalline film integrally and ionically bonded thereto in a reduction reaction of a complex ion solution, the film coating the entire particle surface.

2. A ferrite ceramic composition powder according to claim 1 wherein said fine particles of ceramic material are selected from the group consisting essentially of zircon, zirconia, silicon dioxide, alumina, cobalt oxide, titanium oxide, barium oxide and boron oxide, an oxide, a nitride or a carbide of a metallic or semi-metallic element.

3. A ferrite ceramic composite powder according to claim 1 wherein said complex ion is composed of iron and a metallic element other than iron.

4. A ferrite ceramic composite powder according to claim 1 wherein said complex ion is composed of iron and a semi-metallic element.

5. A ferrite ceramic composite powder according to claim 1 wherein said fine ceramic particles have an average particle size of from about 0.05 to about 20 microns.

6. A ferrite ceramic composite powder according to claim 1 wherein said crystalline film bonded to the ceramic particles is the reaction product of complex ions, selected from the group consisting of metals and semi-metals, and an alkaline agent.

7. A ferrite ceramic composite powder according to claim 1 wherein the particle size of the ferrite ceramic composite powder is in the range of from about 0.05 to about 25 microns.

8. A ferrite ceramic composite powder according to claim 2 wherein said semi-metallic element is selected from the group consisting essentially of cobalt, barium or titanium.

9. A ferrite ceramic composite powder according to claim 1 wherein the particle size of said ferrite ceramic composite powder is in the range from about 0.1 to about 25 microns.

10. A method of manufacturing a ferrite ceramic composite powder comprising the steps of:
immersing pieces of iron in an aqueous solution of ferric chloride in the presence of a magnetic field to provide a complex ion solution,
adding said complex ion solution to an aqueous solution of ferric chloride containing fine particles of a ceramic material to obtain a composite aqueous solution, and
adding an aqueous solution of caustic soda to said composite aqueous solution such that the complex ion reacts and precipitates in crystalline form as a ferrite film, covering the entire surface of the fine ceramic particles to provide ferrite-ceramic composite particles.

11. A method according to claim 10 wherein said fine particles of ceramic material are selected from the group consisting essentially of zircon, zirconia, silicon dioxide, alumina, cobalt oxide, titanium oxide, barium oxide and boron oxide, an oxide, a nitride or a carbide of a metallic or a semi-metallic element.

12. The method according to claim 10, further comprising adding a chloride of a metallic element or a semi-metallic element to the ferric chloride solution containing many fine particles of a ceramic material.

13. The method according to claim 10 wherein said fine ceramic particles have an average particle size of from about 0.05 to about 20 microns.

14. The method according to claim 10 wherein said complex ion solutions and said ferric chloride solution when mixed, comprise about 30 to about 50% of the total volume of the composite aqueous solution.

15. The method according to claim 10 wherein said aqueous solution of ferric chloride has a concentration in the range of from about 5 to about 35%.

16. A method according to claim 10 wherein said alkaline agent is caustic soda having a concentration of about 30%.

17. A method according to claim 10 further comprising separating said ferrite ceramic composite particles from a remaining solution by centrifugation, disposing of a resulting supernatant liquid, rinsing the separated particles with water and drying the ferrite ceramic composite particles.

18. A method according to claim 17 wherein said rinsing comprises adding water to said separated composite particles.

19. A method according to claim 19 wherein said drying step comprises separating said ferrite ceramic composite particles from a rinsing solution, disposing of said rinsing solution, and evaporating any of said solution remaining with said composite particles.

20. The method according to claim 10 wherein said ferrite ceramic composite particles are in the range of about 0.05 to about 25 microns.

21. The method according to claim 10 further comprising the step of rinsing and drying said composite particles.

22. The method according to claim 19 further comprising separating the rinsing solution from the composite particles by centrifugation.

23. A ferrite-ceramic composite powder produced by the method comprising:
dissolving iron in an aqueous solution of ferric chloride in the presence of a magnetic field to provide a complex ion solution;
adding an aqueous solution of ferric chloride and fine ceramic particles to the complex ion solution to form a composite aqueous solution; and
adding an aqueous hydroxide solution to the composite aqueous solution, reacting and precipitating a ferrite film in crystalline form which covers the entire surface of the fine ceramic materials.

* * * * *